United States Patent
Choi et al.

(10) Patent No.: US 11,196,605 B2
(45) Date of Patent: Dec. 7, 2021

(54) METHOD FOR ELIMINATING INTERFERENCE BETWEEN RESOURCE BLOCKS FOR FILTERBANK MULTICARRIER SCHEME AND APPARATUS USING THEREOF

(71) Applicant: RESEARCH COOPERATION FOUNDATION OF YEUNGNAM UNIVERSITY, Gyeongsan-si (KR)

(72) Inventors: Kwon Hue Choi, Gyeongsan (KR); Dong Jun Na, Gyeongsan (KR)

(73) Assignee: RESEARCH COOPERATION FOUNDATION OF YEUNGNAM UNIVERSITY

( * ) Notice: Subject to any disclaimer, the term of this patent is extended or adjusted under 35 U.S.C. 154(b) by 131 days.

(21) Appl. No.: 16/670,114

(22) Filed: Oct. 31, 2019

(65) Prior Publication Data
US 2020/0145272 A1   May 7, 2020

(30) Foreign Application Priority Data

Nov. 1, 2018   (KR) .................. 10-2018-0132866

(51) Int. Cl.
*H04L 27/26* (2006.01)
*H04L 25/03* (2006.01)

(52) U.S. Cl.
CPC .... *H04L 27/2636* (2013.01); *H04L 25/03821* (2013.01); *H04L 27/264* (2013.01); *H04L 27/2607* (2013.01); *H04L 2025/03624* (2013.01)

(58) Field of Classification Search
CPC ............. H04L 27/2628; H04L 27/2614; H04L 27/2636; H04L 43/16; H04L 27/2621;
(Continued)

(56) References Cited

U.S. PATENT DOCUMENTS 9,847,897 B1    12/2017  Cheng et al.
2014/0169437 A1*  6/2014  Hadani ............... H04L 27/2697
                                        375/232

(Continued)

FOREIGN PATENT DOCUMENTS

KR   2016-0091286 A   8/2016

OTHER PUBLICATIONS

Dongjun Na and K. Choi. PAPR Reduction Scheme for FBMC-OQAM without Side Information, ICC 2019, 2019 IEEE International Conference on Communications (ICC), May 2019 (6 pages).

(Continued)

*Primary Examiner* — Oussama Roudani
(74) *Attorney, Agent, or Firm* — Harness, Dickey & Pierce, P.L.C.

(57) ABSTRACT

The present disclosure relates to a method and an apparatus for reducing or eliminating interferences between resource blocks in a transmitter and/or a receiver of a filter bank multicarrier system is provided. According to at least one embodiment, the method comprises performing discrete Fourier transform (DFT) on a data symbol vector to be transmitted thereby generating a DFT-spread data symbol vector, performing a cyclic shift operation on the DFT-spread data symbol vector to arrange a small magnitude element of the DFT-spread data symbol vector at an edge of a resource block allocated to the DFT-spread data symbol vector, and performing filter bank multicarrier (FBMC) modulation on a cyclically shifted DFT-spread data symbol vector.

14 Claims, 5 Drawing Sheets

(58) Field of Classification Search
CPC . H04L 27/2639; H04L 27/262; H04L 5/0048; H04L 27/2601; H04L 25/03821; H04L 27/2607; H04L 27/264; H04L 27/2654; H04L 2025/03624; H04J 11/003
See application file for complete search history.

(56) References Cited

U.S. PATENT DOCUMENTS

| | | | | |
|---|---|---|---|---|
| 2016/0006530 | A1* | 1/2016 | Nazarathy | H04L 1/0071 398/76 |
| 2017/0134203 | A1* | 5/2017 | Zhu | H04L 27/264 |
| 2018/0167244 | A1* | 6/2018 | Cheng | H04L 27/2628 |
| 2019/0123947 | A1* | 4/2019 | Atungsiri | H04L 5/0007 |
| 2020/0008228 | A1* | 1/2020 | Lee | H04W 72/1284 |
| 2020/0059342 | A1* | 2/2020 | Sahin | H04L 27/2613 |
| 2020/0344099 | A1* | 10/2020 | Sahin | H04W 16/14 |

OTHER PUBLICATIONS

Dongjun Na, et al. DFT Spreading-based Low PAPR FBMC with Embedded Side Information, IEEE Trans. Commun., May 2019 (15 pages).
Kwonhue Choi, Alamouti Coding for DFT Spreading-based Low PAPR FBMC, IEEE Trans. Wireless Commun. vol. 18, No. 2, Feb. 2019 pp. 926-941(15 pages).
Dongjun Na, et al. Low PAPR FBMC, IEEE Transactions on Wireless Communications, vol. 17, No. 1, Jan. 2018 (12 pages).
Vincent Berg, et al. A Multiuser FBMC Receiver Implementation for Asynchronous Frequency Division Multiple Access, 2014 17th Euromicro Conference on Digital System Design, (6 pages).
M. Bellanger, FBMC physical layer: a primer PHYDYAS (Jun. 2010) 31 pages.
Tilde Fusco, et al. Sensitivity of Multi-User Filter-Bank Multicarrier Systems to Synchronization Errors, ISCCSP 2008, Malta, Mar. 12-14, 2008 (pp. 393-398) (6 pages).

* cited by examiner

METHOD FOR ELIMINATING INTERFERENCE BETWEEN RESOURCE BLOCKS FOR FILTERBANK MULTICARRIER SCHEME AND APPARATUS USING THEREOF

RELATED APPLICATIONS

The present application is based on, and claims priority from, Korean Patent Application No. 10-2018-0132866, filed Nov. 1, 2018, the disclosure of which is hereby incorporated by reference herein in its entirety.

TECHNICAL FIELD

The present disclosure relates to a method and an apparatus for reducing interferences between resource blocks in a transmitter and/or a receiver of a filter bank multicarrier system.

BACKGROUND

The statements in this section merely provide background information related to the present disclosure and do not necessarily constitute prior art.

The filter bank multicarrier (FBMC; also known as FBMC/OQAM)) transmission technology involves an architecture of a high complexity compared to an orthogonal frequency division multiplexing (OFDM) transmission technology and has not received much attention in the past because sufficient frequency resources can be secured by the OFDM transmission technology alone. However, at least three factors: the recent rapid development of semiconductor technology that has overcome the limitation of implementation complexity, the exponential increase of the number of users due to popularization of the Internet of Things (IoT) or Machine to Machine (M2M), and the requirement for higher communication speed demand such FBMC transmission technology that can use frequency efficiently.

The FBMC transmission technology requires higher complexity than the OFDM transmission technology, but has less leakage power between resource blocks, and does not require a cyclic prefix (CP), thereby achieving higher frequency efficiency. However, the FBMC transmission technology requires a robust filter that can guarantee orthogonality without using CP in resource block having the time and frequency fluctuation due to the multipath effect and the Doppler effect, not having inter symbol interference (ISI) or inter-carrier interference (ICI).

NON-PATENT REFERENCES

[1] M. Bellanger et al., *FBMC Physical Layer: A Primer*, PHYDYAS, June 2010. [Online] Available: http://www.ict-phydyas.org/teamspace/
[2] Fusco et al., "Sensitivity of multi-user filterbank multicarrier systems to synchronization errors," in *Proc. IEEE Int. Symp. Commun. Control Signal Process*, March 2008, pp. 393-398.
[3] Berg et al., "A multiuser FBMC receiver implementation for asynchronous frequency division multiple access," in *Proc. Euromicro Conf. Digit. Syst. Design*, Verona, Italy, August 2014, pp. 16-21.
[4] D. Na et al., "Low PAPR FBMC," *IEEE Trans. Wireless Commun.*, vol. 17, no. 1, pp. 182-193, January 2018.
[5] K. Choi, "Alamouti coding for DFT spreading-based low PAPR FBMC," *IEEE Trans. Wireless Commun.*, vol. 18, no. 2, pp. 926-941, February 2019.
[6] D. Na and K. Choi, "PAPR Reduction Scheme for FBMC-OQAM without Side Information," *ICC 2019-2019 IEEE International Conference on Communications (ICC)*, May 2019.
[7] D. Na et al., "DFT Spreading-based Low PAPR FBMC with Embedded Side Information," *IEEE Trans. Commun.*, Early Access, May 2019.

SUMMARY

The present disclosure proposes and describes a new frequency asynchronous multiuser FBMC scheme that allows for substantially expanded tolerances of oscillator inaccuracy or Doppler shift. According to the new multiuser FBMC scheme, DFT-spread data symbols go through a cyclic shift operation prior to FBMC modulation. The interference between frequency asynchronous users' adjacent resource blocks (RBs) is minimized.

In accordance with at least one embodiment, the present disclosure provides a method of eliminating interferences between adjacent resource blocks in a transmitter of a filter bank multicarrier system. The method comprises performing discrete Fourier transform (DFT) on a data symbol vector to be transmitted thereby generating a DFT-spread data symbol vector, performing a cyclic shift operation on the DFT-spread data symbol vector to arrange a small magnitude element of the DFT-spread data symbol vector at an edge of a resource block allocated to the DFT-spread data symbol vector, and performing filter bank multicarrier (FBMC) modulation on a cyclically shifted DFT-spread data symbol vector.

According to another aspect of the present embodiment, the present disclosure provides a method of eliminating interferences between adjacent resource blocks in a receiver of a filter bank multicarrier system. The method comprises performing filter bank multicarrier (FBMC) demodulation on a signal and thereby reconstructing a discrete Fourier transform-spread (DFT-spread) data symbol vector. The DFT-spread data symbol vector having been cyclically shifted by a transmitter of the filter bank multicarrier system such that a small magnitude element of the DFT-spread data symbol vector is arranged at an edge of a resource block allocated to the DFT-spread data symbol vector. The method further comprises compensating for the cyclically shifting of the transmitter upon the DFT-spread data symbol vector, and performing inverse discrete Fourier transform (IDFT) on the compensated DFT-spread data symbol vector and thereby generating a DFT-despread data symbol vector.

According to still another aspect of the present embodiment, the present disclosure provides an apparatus of eliminating interferences between adjacent resource blocks in a transmitter of a filter bank multicarrier system. The apparatus comprises a DFT-spreader for performing discrete Fourier transform (DFT) on a data symbol vector to be transmitted thereby generating a DFT-spread data symbol vector, a cyclic shifter for performing a cyclic shift operation on the DFT-spread data symbol vector to arrange a small magnitude element of the DFT-spread data symbol vector at an edge of a resource block allocated to the DFT-spread data symbol vector, and a FBMC modulator for performing filter bank multicarrier (FBMC) modulation on a cyclically shifted DFT-spread data symbol vector.

According to still another aspect of the present embodiment, the present disclosure provides an apparatus of eliminating interferences between adjacent resource blocks in a receiver of a filter bank multicarrier system. The apparatus comprises a FBMC demodulator for performing filter bank multicarrier (FBMC) demodulation on a signal and thereby reconstructing a discrete Fourier transform-spread (DFT-spread) data symbol vector. The DFT-spread data symbol vector has been cyclically shifted by a transmitter of the filter bank multicarrier system such that a small magnitude element of the DFT-spread data symbol vector is arranged at an edge of a resource block allocated to the DFT-spread data symbol vector. The apparatus further comprises a cyclic shifter for compensating for the cyclically shifting of the transmitter upon the DFT-spread data symbol vector, and an IDFT-spreader for performing inverse discrete Fourier transform (IDFT) on the compensated DFT-spread data symbol vector and thereby generating a DFT-despread data symbol vector.

DETAILED DESCRIPTION

Figure 1:
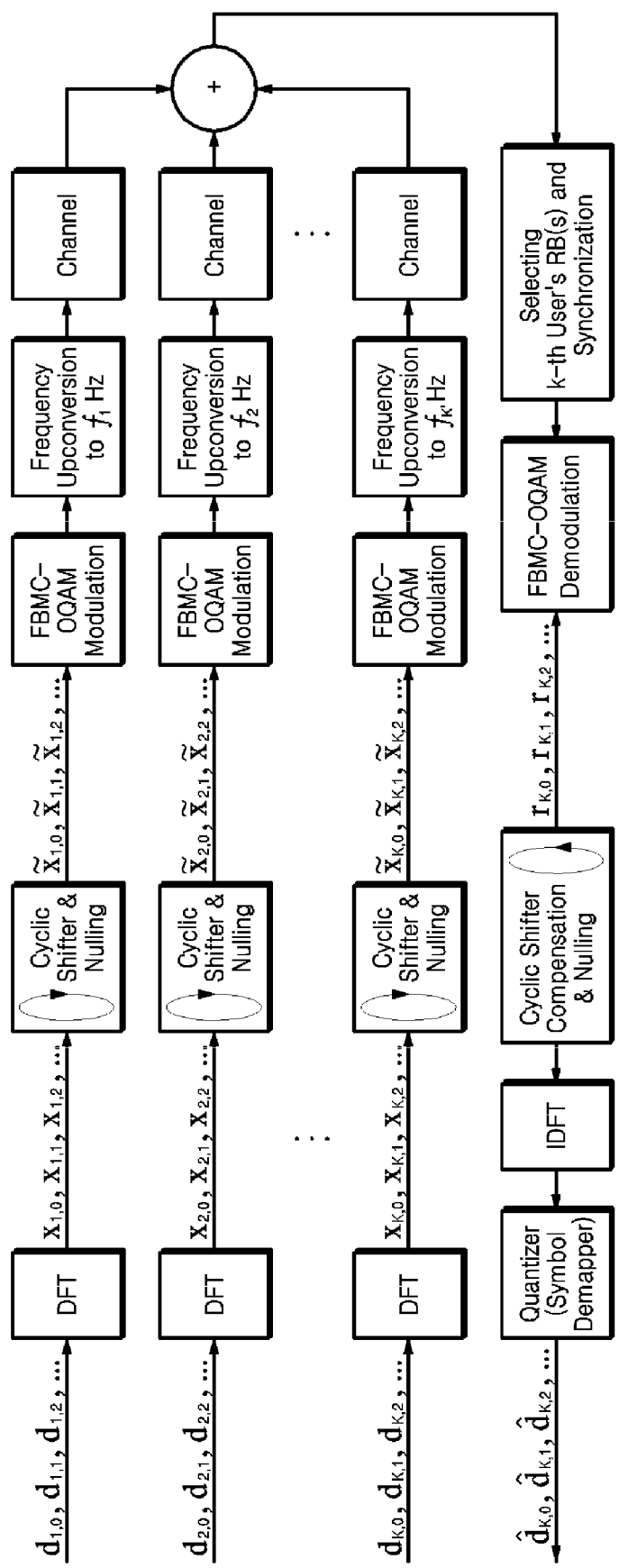
FIG. 1 shows an uplink system model of a multiuser DFT-s FBMC according to at least one embodiment of the present disclosure.

Some embodiments of the present disclosure provide a method of removing a resource-block-to-block interference for employing the FBMC transmission technology and an apparatus using thereof.

With the well frequency-localized pulse shaping filter of FBMC-OQAM (filter bank multicarrier with offset quadrature amplitude modulation; for simplicity, FBMC-OQAM is also referred to "FBMC" or "FBMC modulation"), ideally, only one null (guard) subcarrier is required in between frequency-adjacent resource blocks (RBs) that are allocated to the different users of FBMC-based uplink system. In practical uplink systems, there are typically different frequency offsets (FOs) among the users called interuser FOs (IUFOs) or multiple FOs. This is due to the inevitable mismatches among the users' transmit oscillators and the different Doppler shifts in mobile systems. In fifth-generation (5G) systems and beyond, much larger IUFOs need to be considered because of the higher Doppler shift by using mm-wave bands with higher mobility. Fusco et al. [2] analyzed a frequency asynchronous FBMC system only with a non-fading channel, and the IUFO range was set very small. Berg et al. [3] only considered a time-asynchronous FBMC system while assuming zero IUFO. If IUFOs are present, the band edge subcarriers of the frequency adjacent RBs allocated to the different users possibly overlap, and thus, inter-carrier interference (ICI) occurs. The discrete Fourier transform-spread (DFT-s) FBMCs have gained attention in recent literature for its low PAPR benefit (refer to Non-patent references [4]-[7]). In this case, ICI is even more severe because the band edge subcarrier magnitudes can instantaneously be very large due to DFT spreading.

We can easily overcome ICI at the RB's band edge by simply inserting more null subcarriers. However, this results in spectral inefficiency, which becomes critical when N denoting the number of subcarriers per RB is small for fine resource granularity, as in the case of Long Term Evolution (LTE) uplink, where N is 12. With N=12, one more null subcarrier in between the frequency adjacent RBs results in about 7.7% bandwidth overhead. Therefore, it is crucial to devise a suitable scheme for uplink FBMC systems with large IUFOs.

The present disclosure proposes a new frequency asynchronous FBMC scheme with substantially expanded tolerances of oscillator inaccuracy or Doppler shift. The contributions of the present disclosure are summarized as follows.

A novel cyclic shift idea in conjunction with DFT-spreading is proposed for uplink FBMC systems.

Unlike the previous works on uplink FBMC, the proposed scheme significantly increases the allowable IUFO range without wasteful guard subcarriers.

The proposed scheme relaxes RF requirements such as oscillator accuracy and pre-compensation of Doppler shift, and does not require complicated algorithms for interuser interference cancellation.

In the following description, DFT[x] and IDFT[x] denote the DFT and inverse DFT outputs of the vector x, respectively, and $[f(n)]_{n=a}^{b}$ denotes $[f(a), f(a+1), \ldots, f(b)]^{T}$.

DFT-Spread FBMC

FIG. 1 shows an uplink system model of a multiuser DFT-s FBMC according to at least one embodiment of the present disclosure.

In FIG. 1, the shaded blocks are added for the proposed scheme. We consider K frequency-adjacent RBs, which each contain N subcarriers (subchannels) and are allocated to one of K users. Without loss of generality, the kth RB is assumed to be allocated to the kth user. For high data rate service, the multiple RBs may be allocated to the same user and are placed apart with a distance larger than the bandwidth of K RBs for frequency diversity. Hence, the RB index k is used as a user index as well. The FBMC in-band subcarrier spacing is set to 1/T Hz, where T is the symbol duration. Let $f_k$ denote the kth RB's (user's) up-conversion frequency as shown in FIG. 1. For one null subcarrier insertion between adjacent RBs, the adjacent RBs' up-conversion frequency difference, $f_{k+1}-f_k$, is set to (N+1)/T Hz. The only difference from the conventional (non-DFT-s) multiuser FBMC is that DFT spreading is performed prior to FBMC modulation and its counterpart, IDFT, is performed after FBMC demodulation. FBMC modulation and demodulation are well described in Non-patent reference [1], so the details on how they work are omitted here. In FIG. 1, $d_{k,m}$ is the m-th N×1 data symbol vector of the kth RB, $x_{k,m}$ is DFT[$d_{k,m}$], and $r_{k,m}$ is FBMC demodulator output.

Signal Modification to DFT-Spread FBMC

Figure 2:
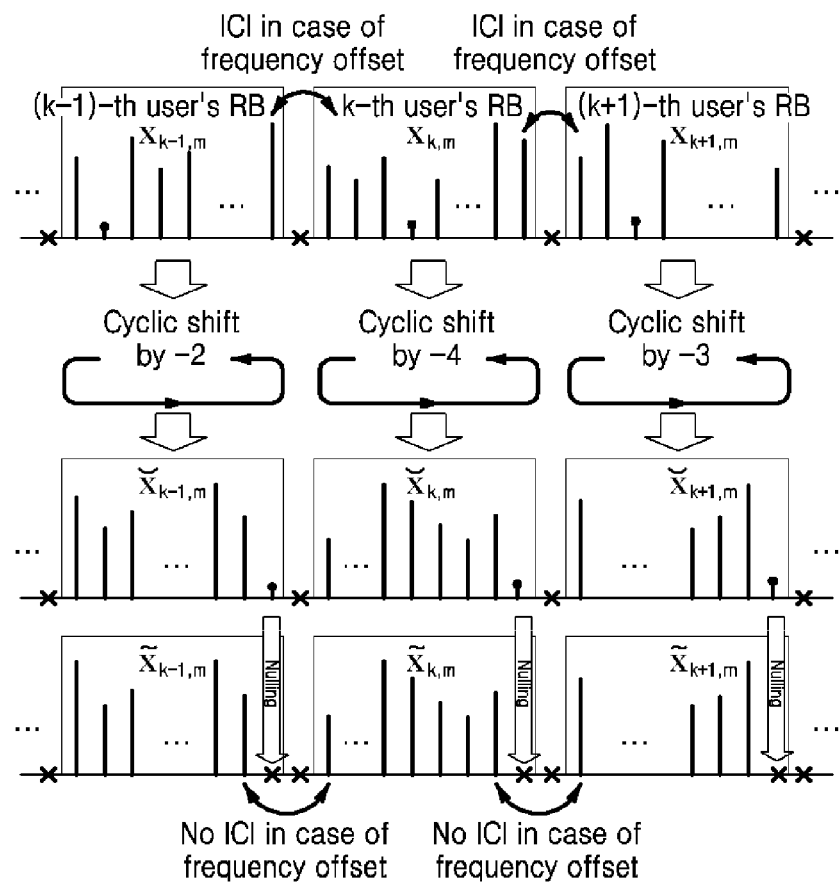
FIG. 2 is a diagram showing subcarrier domain signal modification according to at least one embodiment of the present disclosure.

FIG. 2 is a diagram showing subcarrier domain signal modification according to at least one embodiment of the present disclosure.

The elements of the DFT-spread data symbol vector have non-identical magnitudes, so the subcarriers of the DFT-s FBMC have non-identical magnitudes as well. One shot of the subcarrier magnitudes for adjacent RBs is illustrated at the top of FIG. 2. Despite one null subcarrier in between the RBs' bands, the subcarriers at each RB band edge interfere with the next RBs when there are different FOs among the RBs.

In the proposed scheme, the DFT-spread symbol vector $x_{k,m}$ goes through a cyclic shift operation, as shown in FIG. 1, in order that a small magnitude element is shifted to the rightmost element, as shown in FIG. 2. To do this, we first find the index of the local minimum magnitude element of $x_{k,m}$ as follows:

$$s_{k,m} = \underset{n \in \{1,2,\ldots,N/4\}}{\operatorname{argmin}} |x_{k,m}(n)| \qquad \text{Equation 1}$$

Here, $x_{k,m}(n)$ denotes the nth element of $x_{k,m}$. Then, to place this element at the right band edge, we cyclically shift $x_{k,m}$ to the left by $s_{k,m}$ and obtain $\breve{x}_{k,m}$ which is a cyclically shifted version of $x_{k,m}$.

$$\breve{x}_{k,m} = \underset{-s_{k,m}}{CyclicShift}\{x_{k,m}\} \qquad \text{Equation 2}$$

Here, $$\underset{k}{CyclicShift}\{\}$$

denotes the k element cyclic shift operation. The search range in (1) is limited to the first quarter of the subcarrier indices (i.e., $\{1, 2, \ldots, N/4\}$) and not the whole range. This is to avoid ambiguity in the blind detection solution of $s_{k,m}$, which is explained later.

Unlike the example of FIG. 2, in some other embodiments, the cyclic shift operation may place the small magnitude element at the left band edge. Which band edge of the RB at which the small magnitude element would be placed may be predetermined by the transmitter and the receiver, or may be signaled as system information between the transmitter and the receiver.

When there are FOs among RBs, the ICI from a certain RB to the right-hand-side RB in the subcarrier axis is reduced by the proposed cyclic-shift idea. Meanwhile, as the left most subcarrier of each RB is not minimized, the ICI from the right-hand-side band RB to the considered RB is still significant. Hence, we exclude the right most subcarrier of each RB in the DFT despreading (IDFT) stage in the receiver because it is subject to severe interference. In the transmitter, we forcibly replace the right most subcarrier of each cyclic-shifted RB with zero, as shown at the bottom of FIG. 2 to generate FBMC modulation input denoted by $\tilde{x}_{k,m}$ in FIG. 1. This is because we will not use the zero forced right most subcarrier in the DFT despreading in the receiver. By zero forcing right most subcarrier, we do not minimize but completely eliminate the ICI to the right-hand-side RB.

There is self-interference (SI) because the zero forced subcarrier is not included in the DFT despreading of the receiver. Let $\tilde{d}_{k,m}$ denote the recovered version of $d_{k,m}$ from $\tilde{x}_{k,m}$ by compensating cyclic shift and performing DFT despreading, and let $e_{k,m}$ denote the symbol magnitude-normalized SI term in $\tilde{d}_{k,m}$. Then, $e_{k,m}(n)=(\tilde{d}_{k,m}(n)-d_{k,m}(n))/|d_{k,m}(n)|$.

Table 1 shows the variance and the maximum magnitude of $e_{k,m}(n)$, which are obtained by exhaustive calculation of $e_{k,m}$ for all data symbol combinations of $d_{k,m}$ for N=8 and 16 and for 1010 random generations of $d_{k,m}$ for N=32. It is found that the variance of $e_{k,m}(n)$ is very small. This occurs because the zero forced subcarrier originally had the minimum magnitude in the search range and thus it has an insignificant contribution to DFT despreading. More remarkably, it is found that the maximum of $|e_{k,m}(n)|$ is smaller than 1. This implies that without background noise, the SI alone cannot make a symbol decision error for QPSK, and thus does not make an error floor in the high SNR region.

TABLE 1

| N | 8 | 16 | 32 |
|---|---|---|---|
| Variance of $e_{k,m}(n)$ | 0.066 | 0.0155 | 0.0037 |
| Maximum of $|e_{k,m}(n)|$ | 0.8196 | 0.5957 | 0.3681 |

Intuitively, as N increases, the SI becomes negligible. Nonetheless, the large Ns are not the focus. This is because the RB size N is commonly set small for fine resource granularity like LTE uplink. Moreover, for large Ns, simply inserting more than one null in between adjacent RB bands is a trivial and reasonable solution for combatting the IUFO. For instance, even with N=32, one more null insertion results in only a 3% bandwidth overhead.

Blind Detection of $s_{k,m}$

In FIG. 1, $r_{k,m}$ denotes the FBMC demodulated counterpart to $\tilde{x}_{k,m}$ of the transmitter. We discard the right most subcarrier because it has been forced to zero in the transmitter, and thus, we set $r_{k,m}(N)=0$. For subsequent correct demodulation, the cyclic shift should be compensated prior to the DFT despreading (IDFT) stage, as shown in FIG. 1. Thus, the receiver should know the shift variable, $s_{k,m}$. In the proposed scheme, $s_{k,m}$ is detected in a blind way based on the tentative decision variables. Let $t_{k,m}^{(l)}$ in denote the tentative decision variable vector (quantizer input in FIG. 1) for $d_{k,m}$ where l is a trial value of $s_{k,m}$. Then $t_{k,m}^{(l)}$ is calculated as follows.

$$t_{k,m}^{(l)} = IDFT\left[\underset{l}{CyclicShift}\{r_{k,m}\}\right] \qquad \text{Equation 3}$$

A cyclic shift in the frequency domain is equivalent to multiplying the signal by a complex sinusoid in the time domain. Using this property, we change Equation 3 as follows.

$$t_{k,m}^{(l)} = IDFT\,[r_{k,m}] \odot \left[e^{j\frac{ln2\pi}{N}}\right]_{n=0}^{N-1} \qquad \text{Equation 4}$$

$$= IDFT\left[\underset{s_{k,m}}{CyclicShift}\{r_{k,m}\}\right] \odot \qquad \text{Equation 5}$$

$$\left[e^{j\frac{(l-s_{k,m})n2\pi}{N}}\right]_{n=0}^{N-1}$$

Here, $\odot$ denotes element-wise multiplication. The term $$IDFT\left[\underset{s_{k,m}}{CyclicShift}\{r_{k,m}\}\right]$$

corresponds to the decision variable vector by the correct cyclic shift compensation by $s_{k,m}$. Thus, its elements are distributed around the data symbol constellation points (i.e., ±1±j assuming QPSK). From (5), we know that with $l \neq s_{k,m}$, the tentative decision variable vector $t_{k,m}^{(l)}$ has a residual carrier offset $[\exp\{j(l-s_{k,m})n2\pi/N\}]_{n=0}^{N-1}$. Then, its complex-valued element $t_{k,m}^{(l)}(n)$ rotates as the symbol index n increases, and thus, it stays off the constellation points. Based on this result, the blind estimate of $s_{k,m}$ denoted by $\hat{s}_{k,m}$ is obtained by calculating and comparing the norm of the quantized error vectors for the different l's as follows:

$$\hat{s}_{k,m} = \underset{l \in \{1,2,\ldots,N/4\}}{\operatorname{argmin}} \left| t_{k,m}^{(l)} - t_{k,m}^{(l)\boxplus} \right|^2 \qquad \text{Equation 6}$$

Here, $t_{k,m}^{(l)\boxplus}$ denotes the quantized (QPSK or QAM-demapped) version of $t_{k,m}^{(l)}$. Recall that $s_{k,m}$ in Equation 1 is the local minimum index in the limited region $l \in \{1, 2, \ldots, N/4\}$. Hence, the candidates of $\hat{s}_{k,m}$ in Equation 6 are also limited to this region. If we use Equation 3 in the calculation of Equation 6, N/4 IDFT operations and N/4 N-sized vector norm operations are needed. To circumvent this high-computation-complexity problem, we employ Equation 4 instead of Equation 3. Then, we need the IDFT operation only once and additionally N/4−1 element-wise multiplications of N-sized vectors. Adding the vector norm operations to this, the total number of complexity multiplications (CMs) for the blind detection of $s_{k,m}$ is just $(N/2) \log_2 N + N^2/2 - N$. For small Ns, the complexity is substantially smaller than the basic demodulation complexity of DFT-s FBMC given as $(2\kappa + 9/2 \log_2 N + 10)N$ CMs, where $\kappa$ denotes the pulse-shaping filter overlapping factor (Refer to Non-patent reference [4]). For instance, with $\kappa=4$, the complexity overheads of the proposed schemes with N=8 and 16 are 14% and 25%, respectively.

In the selective fading channel, the channel magnitude inverted FBMC demodulator output $r_{k,m}$ invokes noise enhancement in the DFT despread output $t_{k,m}^{(l)}$. Thus, the norm of the quantized error vectors in Equation 6 undergoes noise enhancement as well. As a more reliable method, we can use an intermediate signal which is free from noise enhancement.

To do this, we express the FBMC demodulated symbol vector $r_{k,m}$ as follows:

$$r_{k,m} = i_{k,m} \odot f_{k,m} \qquad \text{Equation 7}$$

Here, $f_{k,m}$ is an intermediate FBMC demodulated symbol vector with non-inverted channel magnitude, and $i_{k,m}$ is a per-carrier channel magnitude inversion vector. To avoid noise enhancement, we use $f_{k,m}$ instead of $t_{k,m}^{(l)}$ in Equation 6. Then, we use the following rule instead of Equation 6.

$$\hat{s}_{k,m} = \underset{l \in \{1,2,\ldots,N/4\}}{\operatorname{argmin}} \left\| f_{k,m} - \tilde{f}_{k,m}^{(l)} \right\|^2 \qquad \text{Equation 8}$$

Here, $\tilde{f}_{k,m}^{(l)}$ is a reconstructed estimate of $f_{k,m}$ from the tentative quantized output $t_{k,m}^{(l)\boxplus}$ as follows.

$$\tilde{f}_{k,m}^{(l)} = h_{k,m} \odot \underset{-l}{CyclicShift}\left\{ DFT\left[ t_{k,m}^{(l)\boxplus} \right] \right\}$$

The simulation results reveal that the scheme using Equation 8 performs better than the scheme using Equation 6, especially for a small N. This is because a smaller N results in a less reliable decision variable $t_{k,m}^{(l)}$ in in Equation 6 due to the lower frequency diversity and larger SI as a result of the zero forced subcarrier. Thus, the reliability enhancement by the scheme using Equation 8 is more effective in a system with small N compared to one with large N. The scheme using Equation 8 additionally requires N/4 element-wise multiplications and DFTs, but the complexity overhead is acceptable for small N. If N=8, then N/4=2, which means that signal reconstruction is needed only two times. Moreover, the basic computation complexity is small for small N.

Ambiguity of the Solution for $s_{k,m}$

Suppose that we extend the search range of l in Equation 6 (i.e., [1, 2, . . . , N/4]) to the entire range of subcarrier indices. We can express a set of l, $\{1, 2, \ldots, N\}$ as $\{l=(N/4)p+q | p \in \{0, 1, 2, 3\}, q \in \{1, 2, \ldots, N/4\}\}$. Then, the complexity sinusoid, $$e^{j\frac{ln2\pi}{N}}$$

in Equation 4, is rewritten as $$e^{j\frac{(N/4)pn2\pi}{N}} e^{j\frac{qn2\pi}{N}},$$

where $$e^{j\frac{(N/4)pn2\pi}{N}}$$

is simplified as $e^{jpn\pi/2} = j^{pn}$. Hence, substituting $$j^{pn} e^{j\frac{qn2\pi}{N}}$$

into $$e^{j\frac{ln2\pi}{N}}$$

in Equation 4, $t_{k,m}^{(l)}$ in Equation 4 is equal to $j^{pn} t_{k,m}^{(q)}$ and then its quantized version is equal to $j^{pn} t_{k,m}^{(l)\boxplus}$. Substituting these results into Equation 6, $\| t_{k,m}^{(l)} - t_{k,m}^{(l)\boxplus} \|$ is given as $\| j^{pn} t_{k,m}^{(q)} - j^{pn} t_{k,m}^{(l)\boxplus} \| = |j^{pn}| \| t_{k,m}^{(q)} - t_{k,m}^{(l)\boxplus} \|$ which is equal to $\| t_{k,m}^{(q)} - t_{k,m}^{(l)\boxplus} \|$ because $j^{pn} = \pm 1$ and $|j^{pn}| = 1$.

This implies that for the four different l's whose q values in the form of p(N/4)+q are identical, the error term $\| t_{k,m}^{(q)} - t_{k,m}^{(l)\boxplus} \|$ is also identical and this results in four multiple solutions for $s_{k,m}$ in Equation 6. This explains why we limit the range of $s_{k,m}$ to [1, N/4] in Equation 1.

Simulation Results

The system parameters and the channel environments were set as follows. For FBMC pulse shaping, a PYHYDYAS pulse with $\kappa=4$ was employed (refer to Non-patent reference [1]). The subcarrier spacing was set to 15 kHz as in LTE uplink, and each RB from the different users had an independent FO. In other words, there were different FOs among the users. Specifically, the k-th RB's center frequency $f_k$ in FIG. 1 was set to $15e3 \times \{(N+1)(k-1)+\epsilon_k\}$ Hz, where $\epsilon_k$ is a normalized FO that is independent and identically distributed (i.i.d.) for different values of k and is uniformly distributed over $[-\Delta_f, \Delta_f]$. Two typical multipath fading channels, ITU-R Pedestrian A and ITU-R Vehicular A were considered. For per-carrier channel magnitude inversion vector $i_{k,m}$ in Equation 7, the minimum mean-squared error (MMSE) criterion was employed. To include the nonidentical received powers among the RBs due to shadow fading or imperfect power control among the uplink users, the long-term scale factor $10^{S_k/10}$ was multiplied with the k-th RB's received power, where $S_k$ is a zero mean real Gaussian random variable with standard deviation $\sigma$s and is i.i.d. for different values of k.

Figure 3:
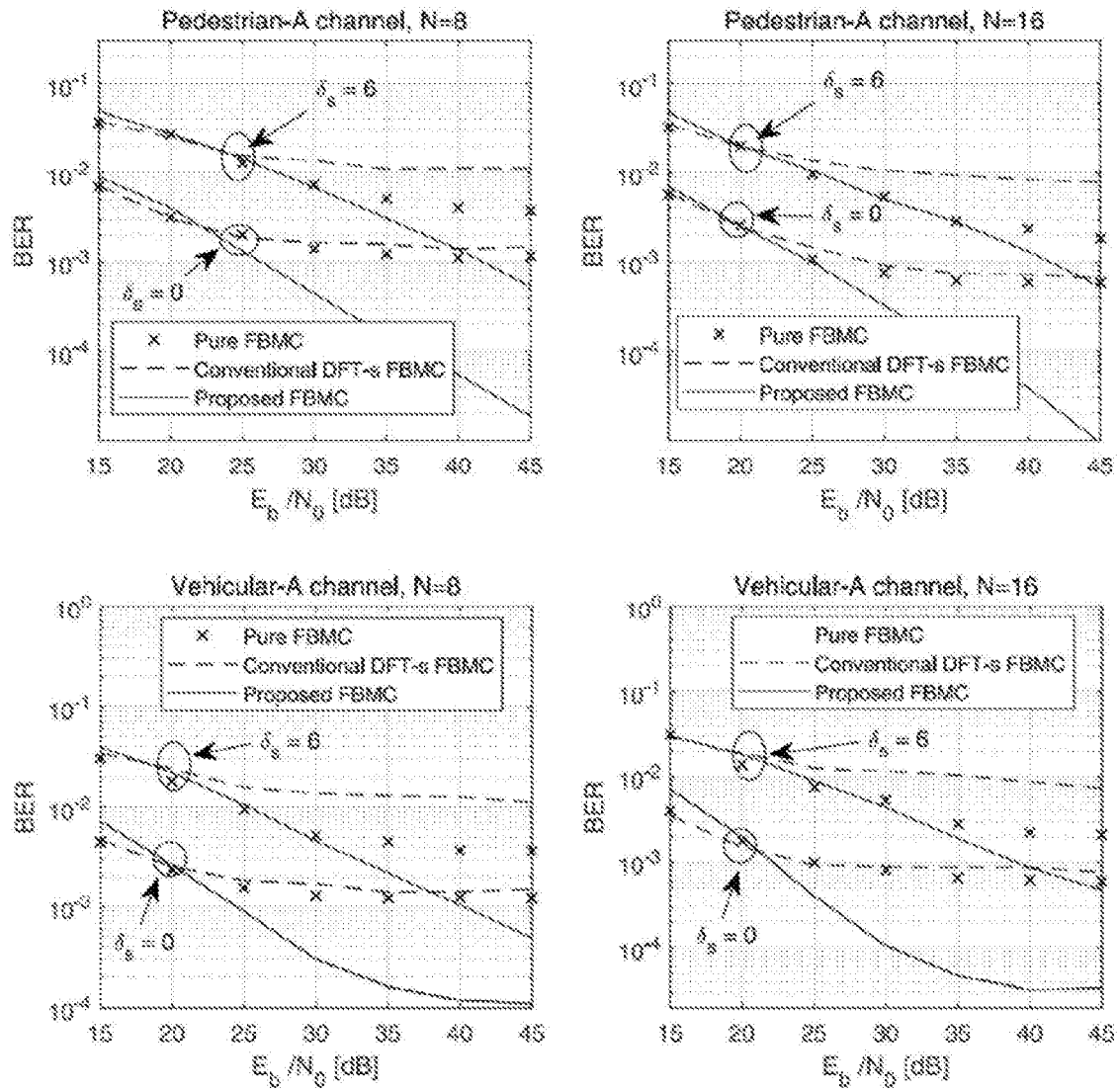
FIG. 3 is a diagram of a simulation result according to at least one embodiment of the present disclosure.

FIG. 3 shows the simulated BERs (bit error rates) of the conventional DFT-s FBMC and the proposed scheme when the data symbol vector $d_{k,m}$ in FIG. 1 is QPSK-modulated with N=8 and 16, K=8, 66 $_f$=0.8, and $\delta_s$=0 and 6. For the blind detection of cyclic shift $s_{k,m}$, Equation 6 and Equation 8 are employed for N=16 and 8, respectively. For reference, the BERs of the pure (non-DFT-s) FBMC are also included. In all cases, as $\delta_s$ increases to 6, the BER performance severely degrades, and the BERs at $E_b/N_0$ as high as 15 dB increase to larger than $10^{-2}$. These large uncoded BERs are unacceptable even with commonly used channel coding schemes, especially for stable data service, which requires an uncoded BER of less than $10^{-3}$. Therefore, the BER performance comparison at these large BER levels is not so meaningful.

Even in a high SNR region, the conventional DFT-s FBMC and the pure FBMC severely deteriorate, irrespective of $\delta_s$ and the BERs saturate. This occurs because the interuser ICI from IUFO is dominant over the background noise. In contrast, the proposed scheme fairly maintains the slope of the BER curves and thus achieves much lower BER than the conventional schemes. This confirms that the proposed cyclic shift technique suppresses the interuser ICI well.

Figure 4:
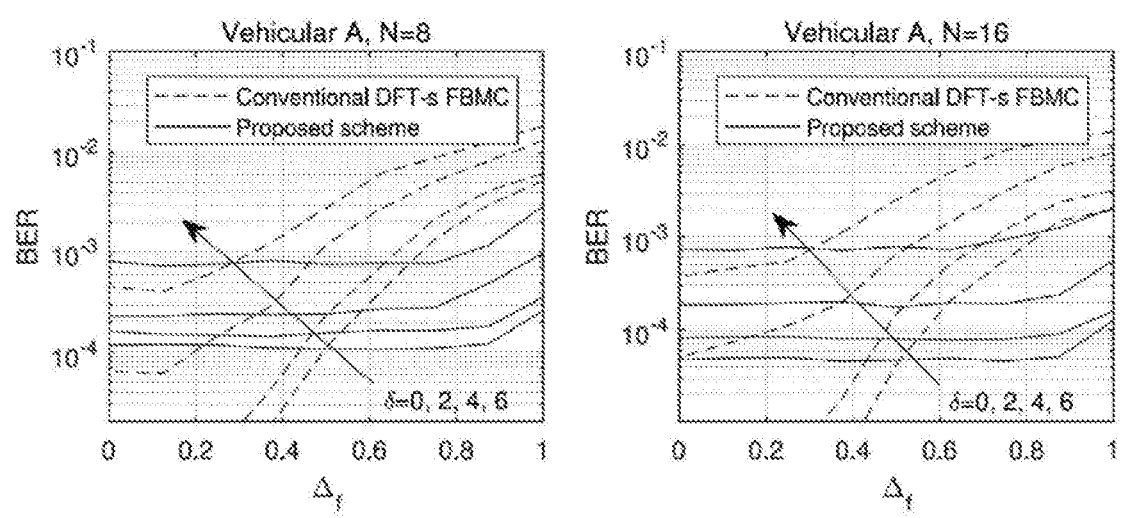
FIG. 4 is a diagram of a simulation result according to at least one embodiment of the present disclosure.

FIG. 4 shows BER as a function of $\Delta_f$ for several values of $\delta_s$. For neat presentation, the results for pure FBMC are excluded, and the trends can be conjectured from FIG. 3. Note that as $\delta_s$ increases, the performance-crossing point of $\Delta_f$ beyond which the proposed scheme outperforms the conventional DFT-s FBMC becomes smaller. This implies that even small IUFO is detrimental to the conventional DFT-s FBMC for larger power differences among the users.

Summing up, the proposed scheme performs better than the conventional FBMC and DFT-s FBMC as $\Delta_f$ and $\delta_s$ increase. As $\Delta_f$ and $\delta_s$ vary relatively slowly, it is feasible to switch between the conventional schemes and the proposed scheme according to these parameters, which will further improve the performance. Switching between the schemes is accomplished by simply including or excluding the cyclic shift operation (and its compensation operation) in FIG. 1.

Figure 5:
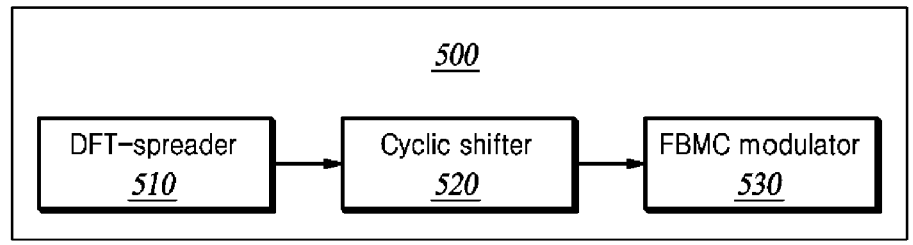
FIG. 5 illustrates an apparatus for reducing or eliminating interferences between resource blocks in a transmitter of a FBMC system according to an embodiment of the present disclosure.

FIG. 5 illustrates an apparatus for reducing or eliminating interferences between resource blocks in a transmitter of a FBMC system according to an embodiment of the present disclosure.

The apparatus 500 may comprise a discrete Fourier transform-spreader (DFT-spreader) 510, a cyclic shifter 520, and an FBMC modulator 130. In FIG. 5, some components may be integrated into a single component, and any one of the components may be divided into multiple subcomponents. In addition, components of the transmitter that are closely related to reducing or eliminating interferences between resource blocks are not elaborated in FIG. 5. Those skilled in the art shall appreciate that the apparatus 500 can be implemented as hardware modules, as software functional modules or as hardware modules integrated with software functional modules.

One or more resource blocks (RBs) may be assigned to the transmitter. FIG. 5 illustrates components that process a k-th resource block among a plurality of resource blocks assigned to the transmitter.

The DFT-spreader 510 inputs a m-th data symbol vector $d_{k,m}$ of the k-th resource block. The DFT-spreader 110 performs a discrete Fourier transform (DFT) on the data symbol vector $d_{k,m}$ to generate a DFT-spread symbol vector $x_{k,m}$.

The cyclic shifter 520 performs a cyclic shift operation, as described with reference to FIG. 2, on the DFT-spread symbol vector $x_{k,m}$ to generate a cyclically shifted version of the DFT-spread symbol vector, in which a small magnitude element becomes the rightmost element (alternatively, the leftmost element). To do this, the cyclic shifter 520 may find the index of the local minimum magnitude element of the DFT-spread symbol vector within a predetermined search range. The search range is limited to the first quarter of the subcarrier indices N (i.e., $\{1, 2, \ldots, N/4\}$). The cyclic shifter 520 may cyclically shift the DFT-spread symbol to the left by the index of the local minimum magnitude element and thereby obtain the cyclically shifted version of the DFT-spread symbol vector.

The cyclic shifter 520 may further replace with zero the right most subcarrier of the resource block corresponding to the rightmost element, and thereby generate a modulation input $\tilde{x}_{k,m}$ to be input to the FBMC modulator 130.

The FBMC modulator 530 performs a FBMC-OQAM modulation on the cyclically shifted version of the DFT-spread symbol vector.

Figure 6:
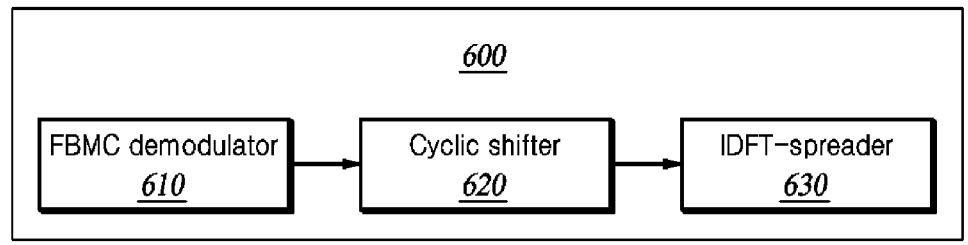
FIG. 6 illustrates an apparatus for reducing or eliminating interferences between resource blocks in a receiver of a FBMC system according to an embodiment of the present disclosure.

FIG. 6 illustrates an apparatus for reducing or eliminating interferences between resource blocks in a receiver of a FBMC system according to an embodiment of the present disclosure. In FIG. 6, some components may be integrated into a single component, and any one of the components may be divided into multiple subcomponents. In addition, components of the receiver that are not closely related to reducing or eliminating interferences between resource blocks are not elaborated in FIG. 6. Those skilled in the art shall appreciate that the apparatus 600 can be implemented as hardware modules, as software functional modules or as hardware modules integrated with software functional modules.

The apparatus 600 may comprise an FBMC demodulator 610, a cyclic shifter 620, and an inverse discrete Fourier transform-despreader (IDFT-despreader) 630.

The processing within the apparatus 600 essentially reverses the processing of the apparatus 500 of FIG. 5.

The FBMC demodulator 610 performs a FBMC-OQAM demodulation on k-th user's resource block to be reconstructed and generates a discrete Fourier transform-spread (DFT-spread) data symbol vector $r_{k,m}$. The DFT-spread data symbol vector has been cyclically shifted by the transmitter of the FBMC system such that a small magnitude element of the DFT-spread data symbol vector is arranged at an edge of the resource block allocated to the DFT-spread data symbol vector.

The cyclic shifter 620 compensates for the cyclically shifting of the transmitter upon the DFT-spread data symbol vector. The cyclic shifter 620 may determine a cyclic shift value for the cyclically shifting made by the transmitter, and may cyclically shift the DFT-spread data symbol vector by the determined cyclic shift value.

The IDFT-despreader 630 performs inverse discrete Fourier transform (IDFT) on the compensated DFT-spread data symbol vector outputted from the cyclic shifter 620, and thereby generates a DFT-despread data symbol vector.

The present disclosure has proposed and described a new frequency asynchronous multiuser FBMC scheme that allows for substantially expanded tolerances of oscillator inaccuracy or Doppler shift. According to the new multiuser FBMC scheme, DFT-spread data symbols go through a cyclic shift operation prior to FBMC modulation. The interference between frequency asynchronous users' adjacent resource blocks (RBs) is minimized. In the receiver, the RBs' cyclic shift values are detected in a simple blind manner. The proposed scheme is expected to reduce the cost of RF and baseband integrated circuits (ICs) by relaxing RF requirements. The proposed scheme is expected to be a promising solution considering that asynchronism is one of the key issues in 5G systems and beyond.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of eliminating interferences between adjacent resource blocks in a transmitter of a filter bank multicarrier system, the method comprising:
   performing discrete Fourier transform (DFT) on a data symbol vector to be transmitted thereby generating a DFT-spread data symbol vector;
   performing a cyclic shift operation on the DFT-spread data symbol vector to arrange a small magnitude element of the DFT-spread data symbol vector at an edge of a resource block allocated to the DFT-spread data symbol vector; and
   performing filter bank multicarrier (FBMC) modulation on a cyclically shifted DFT-spread data symbol vector.

2. The method of claim 1, wherein the cyclically shifting of the DFT-spread data symbol vector comprises:
   searching the small magnitude element among elements of the DFT-spread data symbol vector; and
   cyclically shifting the DFT-spread data symbol vector by an index of the small magnitude element.

3. The method of claim 2, wherein the searching of the small magnitude element is performed over a quarter of the elements of the DFT-spread data symbol vector.

4. The method of claim 1, further comprising:
   replacing the small magnitude element arranged at the edge of the resource block with zero.

5. A method of eliminating interferences between adjacent resource blocks in a receiver of a filter bank multicarrier system, the method comprising:
   performing filter bank multicarrier (FBMC) demodulation on a signal and thereby reconstructing a discrete Fourier transform-spread (DFT-spread) data symbol vector, the DFT-spread data symbol vector having been cyclically shifted by a transmitter of the filter bank multicarrier system such that a small magnitude element of the DFT-spread data symbol vector is arranged at an edge of a resource block allocated to the DFT-spread data symbol vector;
   compensating for the cyclically shifting of the transmitter upon the DFT-spread data symbol vector; and
   performing inverse discrete Fourier transform (IDFT) on the compensated DFT-spread data symbol vector and thereby generating a DFT-despread data symbol vector.

6. The method of claim 5, wherein the compensating for the cyclically shifting comprises:
   determining a cyclic shift value for the cyclically shifting made by the transmitter; and
   cyclically shifting the DFT-spread data symbol vector by the determined cyclic shift value.

7. The method of claim 6, wherein the cyclic shift value is determined from among ¼ of subcarrier indices of the resource block.

8. An apparatus of eliminating interferences between adjacent resource blocks in a transmitter of a filter bank multicarrier system, the apparatus comprising:
   a DFT-spreader for performing discrete Fourier transform (DFT) on a data symbol vector to be transmitted thereby generating a DFT-spread data symbol vector;
   a cyclic shifter for performing a cyclic shift operation on the DFT-spread data symbol vector to arrange a small magnitude element of the DFT-spread data symbol vector at an edge of a resource block allocated to the DFT-spread data symbol vector; and
   a FBMC modulator for performing filter bank multicarrier (FBMC) modulation on a cyclically shifted DFT-spread data symbol vector.

9. The apparatus of claim 8, wherein cyclic shifter performs:
   searching the small magnitude element among elements of the DFT-spread data symbol vector; and
   cyclically shifting the DFT-spread data symbol vector by an index of the small magnitude element.

10. The apparatus of claim 9, wherein the searching of the small magnitude element is performed over a quarter of the elements of the DFT-spread data symbol vector.

11. The apparatus of claim 8, wherein the cyclic shifter replaces the small magnitude element arranged at the edge of the resource block with zero.

12. An apparatus of eliminating interferences between adjacent resource blocks in a receiver of a filter bank multicarrier system, the apparatus comprising:
   a FBMC demodulator for performing filter bank multicarrier (FBMC) demodulation on a signal and thereby reconstructing a discrete Fourier transform-spread (DFT-spread) data symbol vector, the DFT-spread data symbol vector having been cyclically shifted by a transmitter of the filter bank multicarrier system such that a small magnitude element of the DFT-spread data symbol vector is arranged at an edge of a resource block allocated to the DFT-spread data symbol vector;
   a cyclic shifter for compensating for the cyclically shifting of the transmitter upon the DFT-spread data symbol vector; and
   an IDFT-spreader for performing inverse discrete Fourier transform (IDFT) on the compensated DFT-spread data symbol vector and thereby generating a DFT-despread data symbol vector.

13. The apparatus of claim 12, wherein the cyclic shifter performs:
   determining a cyclic shift value for the cyclically shifting made by the transmitter; and cyclically shifting the DFT-spread data symbol vector by the determined cyclic shift value.

14. The apparatus of claim 13, wherein the cyclic shifter determines the cyclic shift value from among ¼ of subcarrier indices of the resource block.

* * * * *